United States Patent [19]
Bokovoy

[11] 3,791,238
[45] Feb. 12, 1974

[54] DIFFERENTIAL MECHANISM OF THE HOLDOUT RING TYPE

[75] Inventor: Ronald D. Bokovoy, Bloomfield Hills, Mich.

[73] Assignee: Boise Cascade Corporation, Boise, Idaho

[22] Filed: Aug. 4, 1972

[21] Appl. No.: 276,681

[52] U.S. Cl. ............................................. 74/650
[51] Int. Cl. ............................................ F16h 35/04
[58] Field of Search ............................... 74/650, 710

[56] References Cited
UNITED STATES PATENTS

| | | | |
|---|---|---|---|
| 2,638,794 | 5/1953 | Knoblock | 74/650 |
| 2,667,088 | 1/1954 | Myers | 74/650 |
| 3,397,593 | 8/1968 | Knoblock | 74/650 |

*Primary Examiner*—Arthur T. McKeon

[57] ABSTRACT

A differential mechanism of the type including a pair of annular driven clutch members spring-biased into driven engagement with an annular central driving member arranged colinearly therebetween, and holdout ring means operable when one of the driven shafts overruns the other for maintaining the corresponding driven clutch member in a disengaged condition relative to the driving member, characterized in that each of the axially split resilient holdout rings is normally biased radically outwardly in an expanded condition into frictional engagement with the outer side wall of the driven clutch recess in which it is rotatably supported. Pilot means contained solely within the driving member are provided for piloting the adjacent ends of the side gears upon which the driven clutch members are axially slidable. According to the preferred embodiment, the adjacent ends of the side gears are journalled in the central cam member, the spring biasing means being arranged either externally or internally of the driven clutch members. According to an alternate embodiment, the piloting is effected by a telescopic connection between the adjacent ends of the side gears.

6 Claims, 14 Drawing Figures

PATENTED FEB 12 1974 3,791,238

DIFFERENTIAL MECHANISM OF THE HOLDOUT RING TYPE

As evidenced by the early U.S. Pats. to Frederickson No. 2,050,304 and Knoblock No. 2,385,864, differential mechanisms have been proposed in the patented prior art that include a pair of driven clutch members arranged on side gear means for axial displacement on opposite sides of a central drive member. Central cam means are provided for disengaging a given driven clutch member from the central driving member when the output shaft associated therewith overruns the other output shaft. According to an improvement in the art — as evidenced, for example, by the Knoblock U.S. Pat. No. 2,638,794 — holdout ring means have been proposed for automatically maintaining said given driven clutch member in the disengaged condition, thereby to avoid chattering between and wear of the corresponding overrunning teeth in the central cam and driven clutch members, respectively.

One problem inherent in such differential mechanisms is that caused by the radial expansion of the axially split holdout rings which occurs due to centrifugal force during high speed operation of the automotive vehicle. This radial expansion of the holdout rings from their initial radially contracted condition to a radially extended condition in engagement with the driven clutch member produces an adverse spacing relationship between the holdout ring teeth and the associated cam teeth, thereby interfering with subsequent re-engagement of the clutch member when the overrunning condition ceases. Thus, the outward expansion of the holdout ring due to centrifugal force causes the ends of the ring to spread, thereby creating an extra large space between the teeth nearest the ends of the ring so that the ring teeth no longer match the spaces provided therefor in the center cam. On re-engagement of the clutch, the holdout ring tends to tilt the clutch member as one holdout tooth attempts to return into its space in the center cam before the others.

Another problem inherent in such known differential mechanisms is that of accurately supporting the various colinearly and/or coaxially arranged components to effect proper indexing and efficient cooperation between the various clutch, cam and holdout ring teeth during the vigorous use experienced in the automotive field. As a consequence of the concentric arrangement of the holdout rings in the annular spaces between the ends of the central cam member and the central driving member, respectively, and — in the embodiment wherein the spring biasing means are arranged internally of the differential mechanism — as a consequence of the provision of internal counterbore recesses at each end of the central cam member, it is somewhat difficult to assure that the central cam member and the holdout rings will always be coaxially arranged relative to the side gears and the driven clutch members. In the previously proposed differential mechanisms, it was customary to provide special bores in the differential casing to facilitate the location of the side gear and clutch members. Consequently, it was generally necessary for manufacturers of differential mechanisms to customize their designs to the configurations and machined tolerances of the customer's casings into which the differentials were to be installed. Furthermore, according to recent trends, it has been desirable to reduce the overall size of the differential casings, whereby many differentials are so narrow that there is insufficient space to pilot the side gears directly to the case. Accordingly, another object of the present invention is to provide an improved differential mechanism that is suited for use with various types of casings without regard for the machined tolerances thereof.

A further drawback of the known differential mechanisms is that in general, owing to restrictions of the internal size and configuration of the casings within which the differential mechanisms are to be mounted, the coil spring means that bias the driven clutch members can only be mounted internally of the differential mechanism, thereby further complicating the piloting of the side gears and the manner of assembling the differential mechanism. Efforts to mount the helical coil springs externally of the driven clutch members indicated that the springs engaged the casing walls, thereby interfering with proper operation of the differential mechanism.

The present invention was developed to avoid the above and other drawbacks of the known differential mechanisms.

Accordingly, a primary object of the present invention is to provide a differential mechanism in which each axially split holdout ring is initially biased radially outwardly into an expanded condition in frictional engagement with the outer wall surface of the annular recess in which it is mounted, thereby assuring, upon increased centrifugal force, an increased frictional engagement between the holdout ring and the driven clutch member, while simultaneously assuring the same spacing relationship between the holdout ring cam teeth and the teeth on the central cam member.

A more specific object of the invention is to provide a differential mechanism which in addition to the aforementioned radially outwardly biased holdout rings, includes pilot means contained solely within the central driving member for piloting the adjacent ends of the side gears. In accordance with the preferred embodiment of the invention, the adjacent ends of the side gears are journalled within the central cam member that is mounted concentrically within the annular driving member. In a second embodiment, one of the side gears includes an end portion of reduced diameter that extends axially in concentrically spaced relation through the central cam member and is telescopically journalled within a corresponding bore contained in the end of the other side gear.

Another object of the present invention is to provide differential apparatus of the type described above, wherein the adjacent ends of the side gears are piloted within the central cam member, the spring biasing means being arranged externally of the driven clutch member. In accordance with a specific improvement afforded by the invention, the coil spring means have a frustoconical configuration, the ends of larger diameter being arranged adjacent the driven clutch members and the ends of smaller diameter being arranged at the remote ends of the differential, thereby permitting insertion of the differential within a relatively narrow differential mechanism having a small internal capacity.

Other objects and advantages of the present invention will become apparent from a study of the following specification when viewed in the light of the accompanying drawing, in which:

Figure 1:
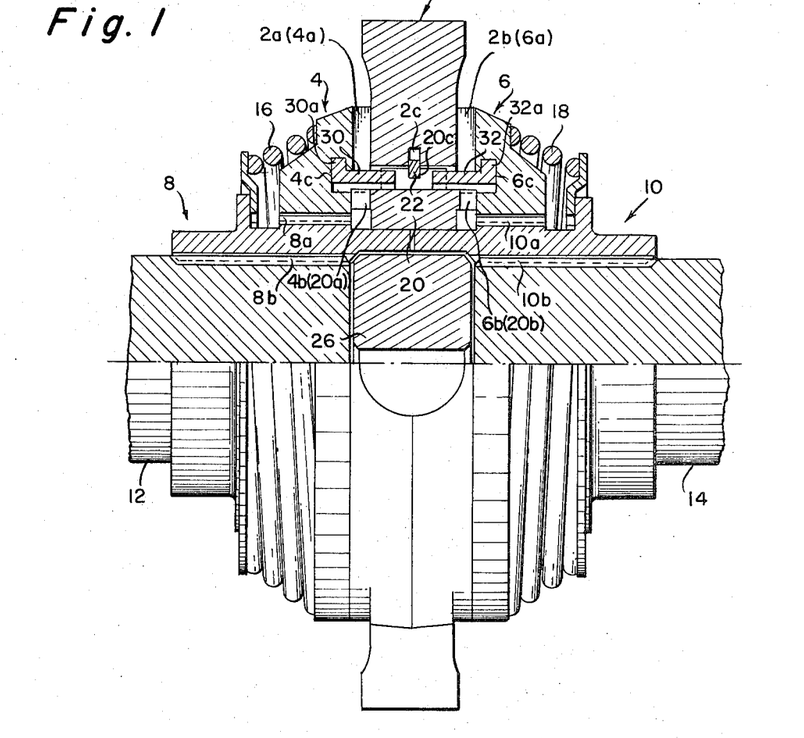
FIG. 1 is a partly sectioned longitudinal elevational view of a first embodiment of the differential mechanism of the present invention.
Figure 2:
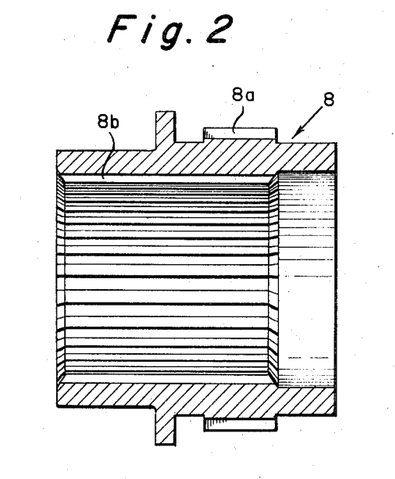
FIGS. 2 and 3 are longitudinal section and end views, respectively, of the side gear means of the embodiment of FIG. 1.
Figure 3:
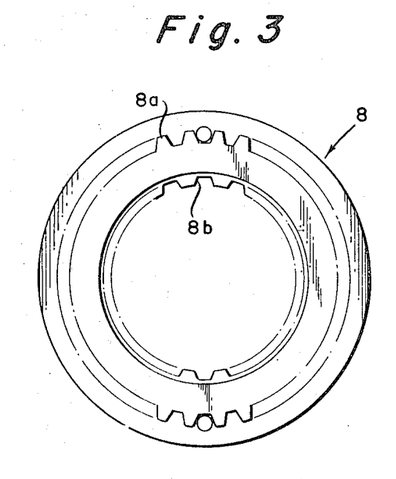
Figure 4:
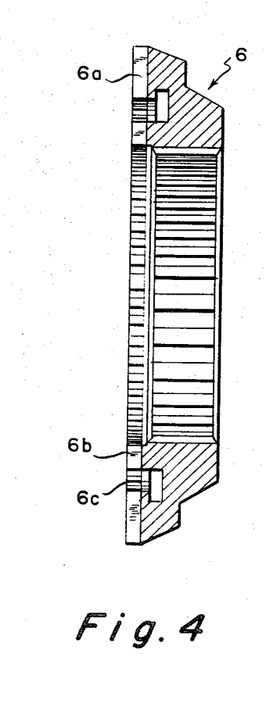
FIGS. 4 and 5 are longitudinal section and end views, respectively, of the right hand driven clutch member of the FIG. 1 embodiment.
Figure 5:
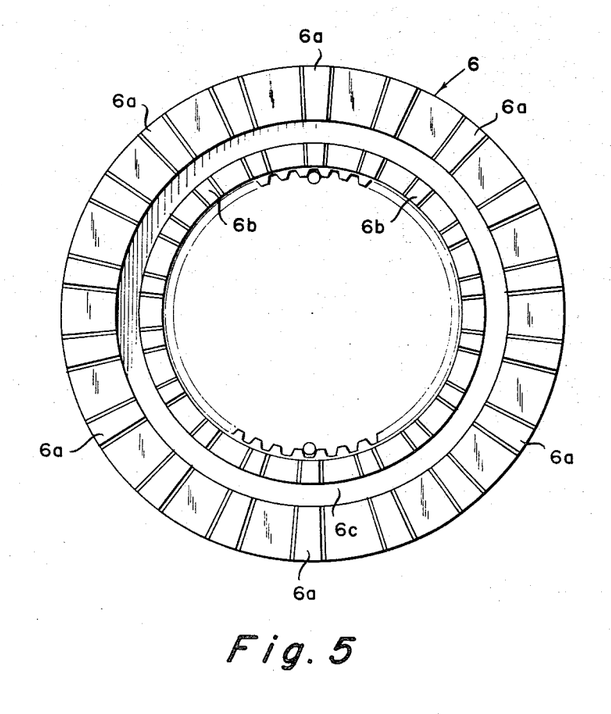
Figure 6:
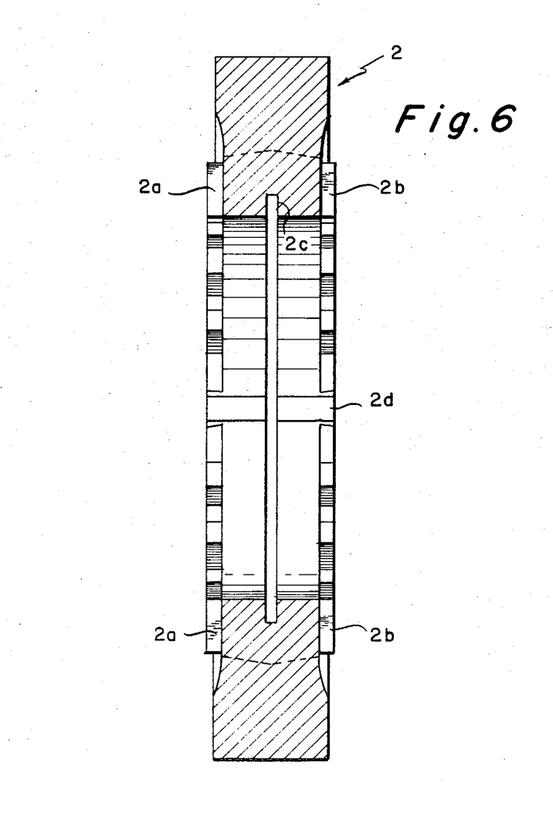
FIGS. 6 and 7 are longitudinal section and end views, respectively, of the driving member.
Figure 7:
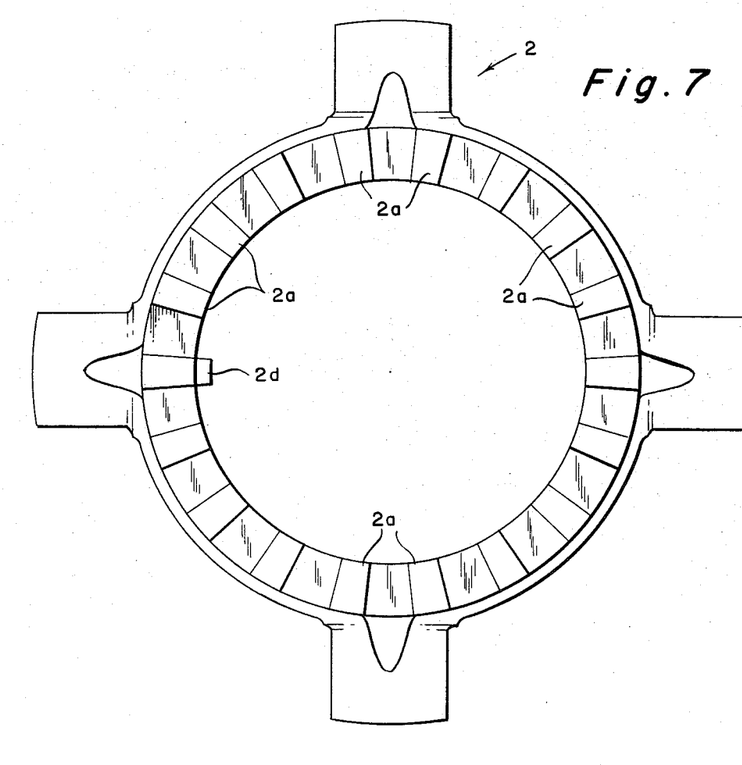
Figure 8:
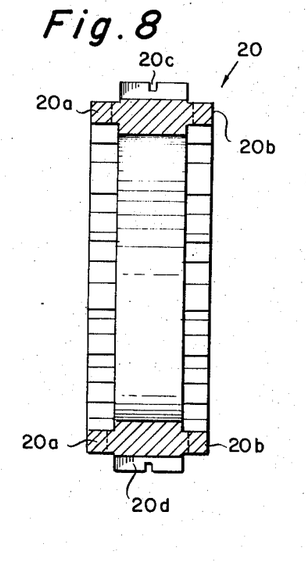
FIGS. 8 and 9 are longitudinal section and end views, respectively, of the center cam member of FIG. 1.
Figure 9:
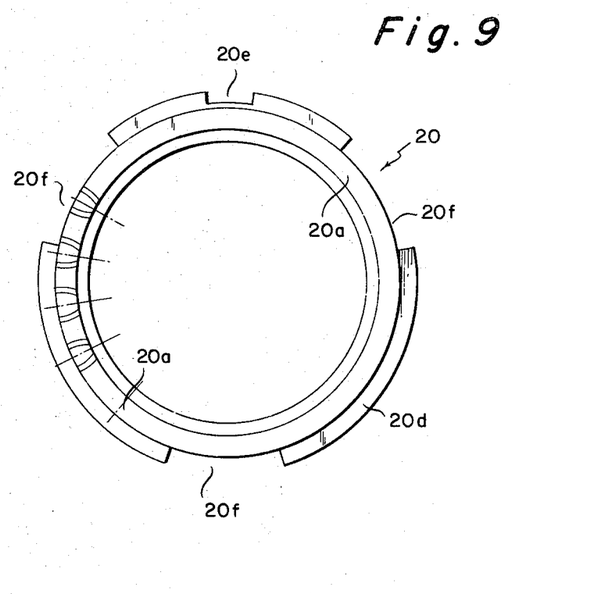

Referring first more particularly to FIG. 1, the differential mechanism includes an annular driving member 2 that is arranged between a pair of annular driven clutch members 4 and 6 that are internally splined for axial sliding movement on the externally splined portions 8a and 10a of a pair of side gears 8 and 10, respectively. The side gears are non-rotatably connected by internal spline means 8b, 10b with a pair of colinearly arranged output shafts 12 and 14, respectively. The driven clutch members are biased together by externally arranged springs 16 and 18 to effect driving engagement between clutch teeth 2a and 2b on opposite ends of the driving member and driven clutch teeth 4a and 6a on the driven clutch members 4 and 6, respectively. Concentrically arranged within the driving member 2 is an annular center cam member 20 having at each end cam teeth 20a, 20b that engage corresponding cam teeth 4b and 6b on the driven clutch members 4 and 6, respectively. The central cam member 20 is retained against axial movement relative to the driving member 2 by means of annular snap ring 22 that extends within the annular grooves 2c and 20c contained in the inner and outer peripheries of the driving and central cam members, respectively. The outer peripheral portion 20d of the central cam member also contains a first through notch 20e (FIG. 9) for an undersized key 2d (FIG. 7) contained on the inner periphery of the driving member, thereby permitting a limited angular adjustment of the central cam member relative to the driving member 2.

In accordance with an important feature of the present invention, the adjacent ends of the side gears 8 and 10 are cylindrical and are journalled within the bore of the central cam member, thereby piloting the adjacent ends of the side gears in a positive manner. An annular spacer disk 26 is mounted within the adjacent ends of the side gears and serve to space the adjacent ends of the output shafts when certain types of wheel bearings are used.

Figures 10, 11:
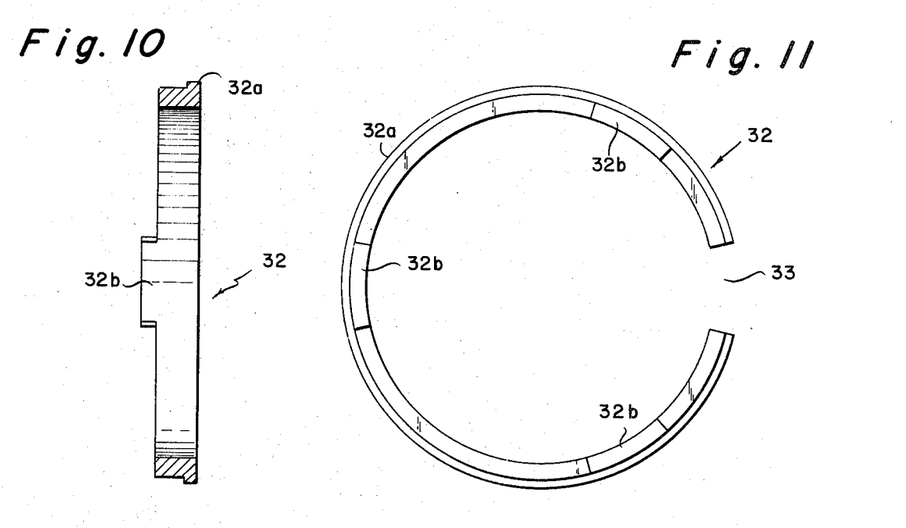
FIGS. 10 and 11 are longitudinal section and end views, respectively, of the right hand holdout ring of FIG. 1.

Arranged colinearly between the driving member 2 and the driven clutch members 4 and 6 are a pair of identical rotatable resilient holdout rings 30 and 32, respectively. Each holdout ring is axially split by slot 33 (FIG. 11) to define a generally C-shaped configuration. The remote ends of the rings are rotatably mounted within corresponding recesses 4c and 6c, respectively. External flanges 30a, 32a extend radially outwardly from the rings within corresponding radial grooves of recesses 4c and 6c, thereby preventing axial movement of the holdout rings relative to the driven clutch members, respectively. In accordance with an important feature of the present invention, the resilient holdout rings are normally biased raidally outwardly toward an expanded condition in frictional engagement with the outer walls of the recesses. The holdout rings are provided at their adjacent ends with axially extending circumferentially arranged teeth (for example, the teeth 32b on holdout ring 32, as shown in FIG. 10), that normally extend within corresponding second peripherally spaced notches 20f (FIG. 9) contained in the peripheral flange portion 20d of the central cam member 20. The axial slot 33 receives the undersized radially inwardly extending projection 2d on the driving member 2. Since the width of slot (33) is greater than slot 20e, the holdout rings 30 and 32 are adapted for greater angular movement relative to the driving member 2 than the central cam member 20.

Figure 12:
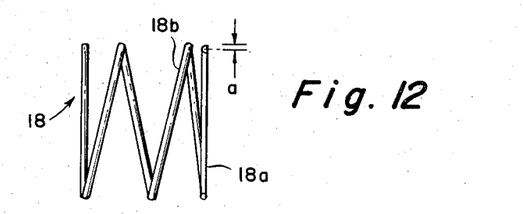
FIG. 12 is a longitudinal elevational view of the frustoconical coil spring of FIG. 1.

Referring now to FIG. 12, it will be seen that the last end turn 18a at the smaller end of the frustoconical spring, by a special coiling technique, is provided with an intentional coil overlap (dimension a) relative to the next active coil turn 18b. Consequently, the conical spring design permits mounting of the differential mechanism in relatively narrow casings provided by the customer, and owing to the overlapped coil construction, sufficient nesting of the compressed turns is permitted to effect complete disengagement of the associated driven clutch member. Furthermore, as a consequence of the conical coil design, the driven clutch members may be provided with a greater thickness, whereby a stronger construction may be achieved to compensate for the reduction in cross-section of the driven clutch member resulting from the provision of the holdout ring recesses.

OPERATION

In normal operation, driving member 2 drives output shafts 12 and 14 at the same rotational velocity via clutch teeth 2a, 4a, driven clutch member 4, spline teeth 8a, side gear 8 and spline teeth 8b, and via clutch teeth 2b, 6a, driven member 6, spline teeth 10a, side gear 10 and spline teeth 10b, respectively.

Assume now that output shaft 14 overruns the other shaft. Owing to the climb-out camming action between cam teeth 20b on the central cam member 20 and corresponding cam teeth 6b on the driven clutch member, said driven clutch member is shifted to the right against the force of spring 18 to disengage driven clutch teeth 6a from the driving teeth 2b. Owing to the connection afforded by external flange 32a, holdout ring 32 is also shifted to the right, thereby withdrawing holdout teeth 32b from the notches 20f in the outer peripheral portion 20d of central cam member 20. Owing to the frictional engagement between holdout ring 32 and driven clutch member 6, the holdout ring is rotated in one direction relative to the central cam member 20 to the extent permitted by the cooperation between internal key 2d and axial slot (33) in the holdout ring 32. The holdout teeth 32b are now opposite the peripheral flange portion 20d of the central cam member, thereby preventing driven clutch member 6 from being shifted to the left to effect re-engagement between driving and driven clutch teeth 2b and 6a, respectively, whereby chattering between the clutch teeth and the resulting wear thereof are eliminated.

As the rotational velocity of the overrunning output shaft 14 is returned to that of shaft 12, the frictional engagement between holdout ring 32 and driven clutch member 6 causes holdout ring 32 to be rotated in the opposite direction relative to the central cam member 20 (as permitted by the cooperation between key 2d and axial slot (33), and when the holdout teeth 32b clear the peripheral flange portion 20d and are opposite slots 20f, the driven clutch member 6 is shifted to the left by spring 18 to effect re-engagement between driving clutch teeth 2b and driven clutch teeth 6a. The output shafts 12 and 14 are now driven at the same rotational velocity by the driving member 2. Upon overrunning of output shaft 12 relative to shaft 14, clutch member 4 is similarly shifted to the left and maintained in the disengaged position by holdout ring 30.

Figure 13:
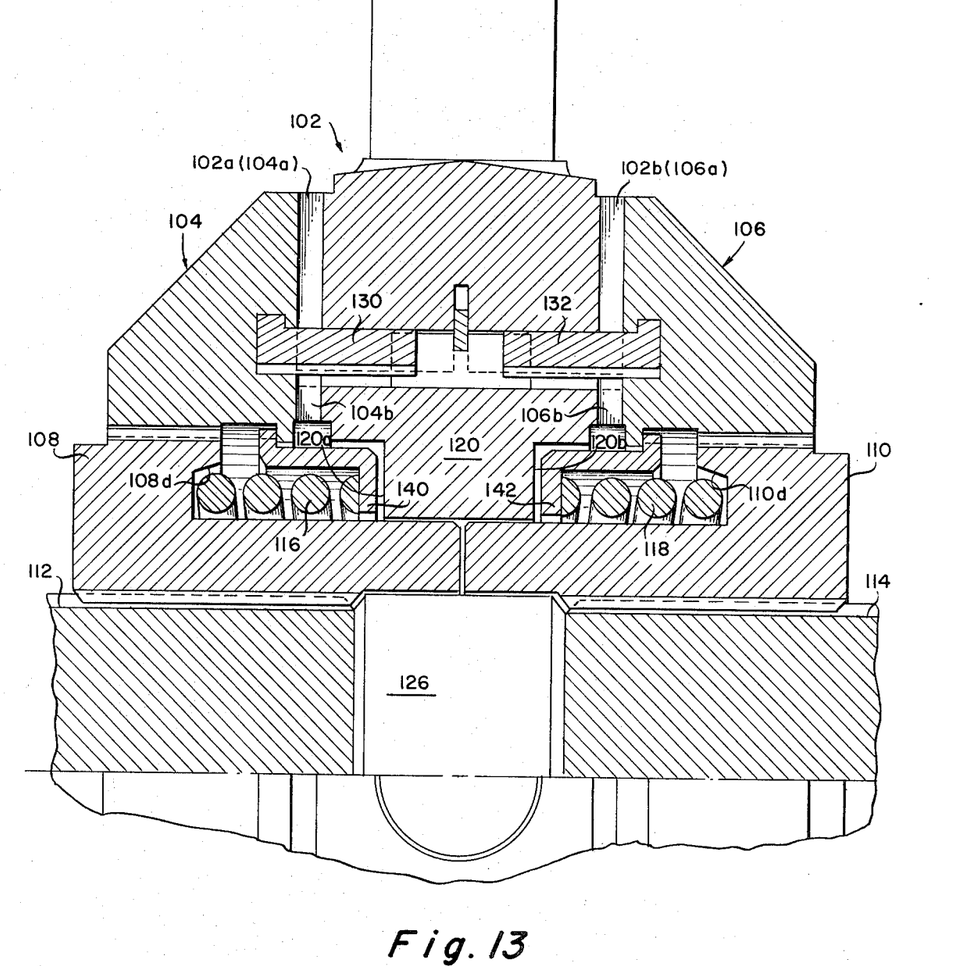
FIG. 13 is a partly sectioned longitudinal view of a modification of the embodiment of FIG. 1, wherein the spring means are mounted internally of the differential mechanism.

Referring now to the modification of FIG. 13, the side gears 108, 110 are again journalled within the central cam member 120, but, as distinguished from the embodiment of FIG. 1, the clutch biasing springs 116 and 118 are helical and are mounted internally of the differential mechanism. More particularly, the remote ends of the springs extend within annular recesses 108d and 110d contained in the adjacent ends of the side gears 108 and 110, respectively. The adjacent ends of the helical coil springs engage annular retainer members 140, 142 that extend radially inwardly from the driven clutch members 104 and 106, respectively, within counterbore recesses 120a, 120b contained in the ends of central cam member 120, respectively. Thus the springs bias the driven clutch members inwardly to effect engagement between driving teeth 102a and 102b and driven teeth 104a and 106a, respectively. The operation of the holdout rings 130 and 132 upon relative overrunning of the output shafts 112 and 114, respectively, is identical to that described above with reference to FIG. 1.

Figure 14:
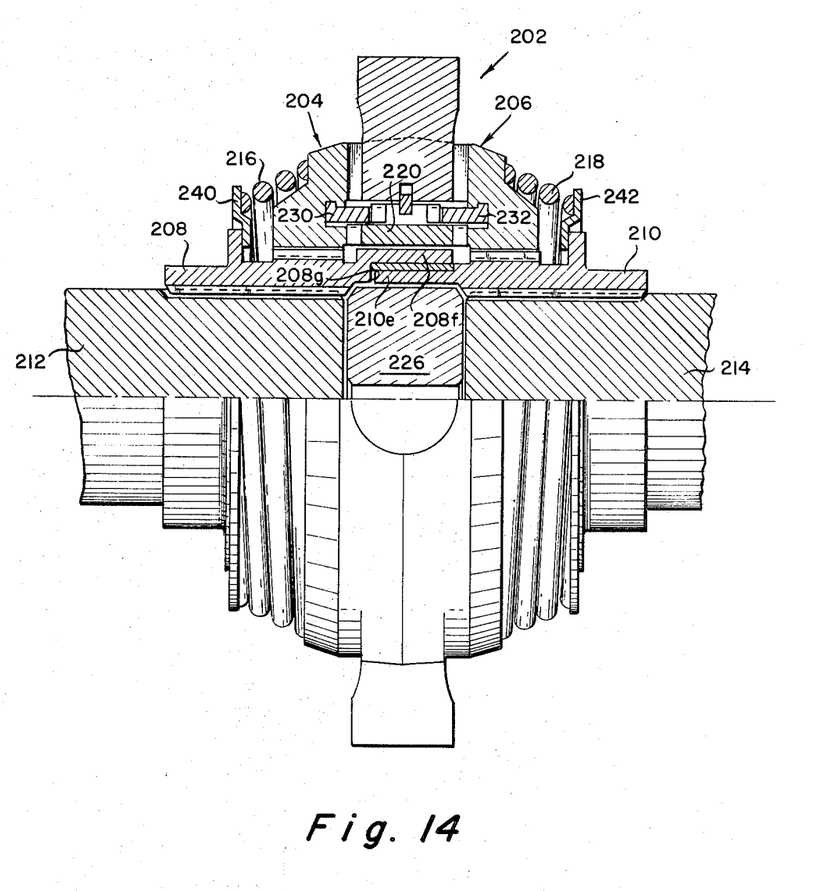
FIG. 14 is a partly sectioned longitudinal view of another embodiment of the invention whereby piloting of the side gears is effected by a telescopic journalled connection.

According to the alternate embodiment of FIG. 14, piloting of the adjacent ends of the side gears is achieved by pilot means including a telescopic journal connection. More particularly, the end portion 208f of side gear 208 contains an axial counterbore 208g that rotatably receives a cylindrical portion 210e of reduced diameter that extends axially from the adjacent end of side gear 210. The remote ends of biasing springs 216 and 218 engage retainer members 240 and 242 that extend radially outwardly from the side gears 208 and 210, respectively. The functional operation of this embodiment is similar to that described above with reference to the embodiment of FIG. 1.

It will be apparent that in each of the three described embodiments, the piloting of the adjacent ends of the side gears wholely within the differential mechanism affords positive alignment of the coaxially arranged components, thereby assuring reliable clutching, declutching and holdout ring operation under the most rugged vehicular requirements. Furthermore, in accordance with the improved inverted holdout design incorporated in each of the three embodiments, the holdout rings are initially in a radially expanded condition in resilient engagement with the corresponding driven clutch members, whereby the rings are positively supported against further radial expansion caused by centrifugal force on high speed operation. This produces the advantageous result that a corresponding increase in the frictional force is produced between the holdout rings and the driven clutch members.

While in accordance with the Patent Statutes the preferred and alternate embodiments have been illustrated and described, it will be apparent to those skilled in the art that various changes and modifications may be made in the apparatus described without deviating from the inventive concepts.

What is claimed is:

1. In a differential mechanism including a pair of colinearly arranged output shafts (12, 14); an annular central driving member (2) arranged in concentrically spaced relation about the adjacent ends of said output shafts; clutch means normally effecting a driving connection between said driving member and said output shafts, respectively, said clutch means including a pair of annular side gears (8, 10) non-rotatably mounted on the adjacent ends of said output shafts, respectively, a pair of driven clutch members (4, 6) mounted on said side gears for axial displacement on opposite sides of said driving member, respectively, and spring means (16, 18) biasing said driven clutch members inwardly in the clutch-engaging direction toward said driving member; means including an annular central cam member (20) operable when one of said output shafts overruns the other for disengaging from said driving member the driven clutch member associated with said overrunning shaft; and holdout ring means (30, 32) for maintaining said associated driven clutch member in the disengaged condition as long as said one output shaft overruns the other shaft, said holdout ring means including a pair of generally annular axially split resilient holdout rings arranged colinearly between said central cam member and said driven clutch members, respectively, the remote ends of said holdout rings being rotatably connected with and extending within annular recesses (4c, 6c) contained in the adjacent faces of said driven clutch members, respectively, the adjacent ends of said holdout rings having axially extending holdout teeth adjacent said central cam member, respectively; the improvement wherein a. each of said holdout rings is resiliently biased radially outwardly into continuous frictional engagement with the outermost side wall of the annular recess contained in the corresponding driven clutch member, respectively, each of said holdout rings including on its outer periphery a circumferential external flange (30a, 32a) that extends within a corresponding annular groove contained in the corresponding outer recess wall, thereby preventing axial movement of said holdout rings relative to said driven clutch members, respectively, each of said holdout rings being angularly adjustable, when the corresponding driven clutch member is in a disengaged condition, from an inoperative first position relative to said central cam member toward an operative second position in which the holdout ring teeth cooperate with said central cam member to maintain the driven clutch member in the disengaged condition, whereby as the rotational speed of the differential mechanism increases, the holdout ring is retained against radial expansion by the outermost recess wall, thereby increasing the frictional engagement between said holdout rings and said driven clutch members, respectively, said central cam member including on its outer periphery an external central flange (20d), said central cam member being positioned coaxially within said central drive member and said holdout rings being positioned in axially spaced relation on opposite sides of said central flange in the annular spaces between the remote ends of said central cam and said central driving members, respectively; and b. further including pilot means contained solely within said central driving member for piloting the adjacent ends of said side gears.

2. In a differential mechanism including a pair of colinearly arranged output shafts (12, 14); an annular central driving member (2) arranged in concentrically spaced relation about the adjacent ends of said output shafts; clutch means normally effecting a driving connection between said driving member and said output shafts, respectively, said clutch means including a pair of annular side gears (8, 10) non-rotatably mounted on the adjacent ends of said output shafts, respectively, a pair of driven clutch members (4, 6) mounted on said side gears for axial displacement on opposite sides of said driving member, respectively, and spring means (16, 18) biasing said driven clutch members inwardly in the clutch-engaging direction toward said driving member; means including an annular central cam member (20) operable when one of said output shafts overruns the other for disengaging from said driving member the driven clutch member associated with said overrunning shaft; and holdout ring means (30, 32) for maintaining said associated driven clutch member in the disengaged condition as long as said one output shaft overruns the other shaft, said holdout ring means including a pair of generally annular axially split resilient hold-out rings arranged colinearly between said central cam member and said driven clutch members, respectively, the remote ends of said holdout rings being rotatably connected with and extending within annular recesses (4c, 6c) contained in the adjacent faces of said driven clutch members, respectively, the adjacent ends of said holdout rings having axially extending holdout teeth adjacent said central cam member, respectively; the improvement a. wherein each of said holdout rings is resiliently biased radially outwardly into continuous frictional engagement with the outermost side wall of the annular recess contained in the corresponding driven clutch member, respectively, each of said holdout rings including on its outer periphery a circumferential external flange (30a, 32a) that extends within a corresponding annular groove contained in the corresponding outer recess wall, thereby preventing axial movement of said holdout rings relative to said driven clutch members, respectively, each of said holdout rings being angularly adjustable, when the corresponding driven clutch member is in a disengaged condition, from an inoperative first position relative to said central cam member toward an operative second position in which the holdout ring teeth cooperate with said central cam member to maintain the driven clutch member in the disengaged condition, whereby as the rotational speed of the differential mechanism increases, the holdout ring is retained against radial expansion by the outermost recess wall, thereby increasing the frictional engagement between said holdout rings and said driven clutch members, respectively, said central cam member including on its outer periphery an external central flange (20d); said central cam member being positioned coaxially within said central drive member and said holdout rings being positioned in axially spaced relation on opposite sides of said central flange in the annular spaces between the remote ends of said central cam and central driving members, respectively;

b. and further including pilot means contained solely within said central driving member for journalling the adjacent ends of said side gears within said central cam member;

c. said spring means being arranged externally of said driven clutch means.

3. Apparatus as defined in claim 1, wherein said side gears include retainer flange means positioned on opposite sides of and axially spaced from the remote ends of said driven clutch members, respectively, and further wherein said spring means comprises a pair of coil springs (16, 18) positioned concentrically about said driven clutch members and said retainer flange means, respectively.

4. Apparatus as defined in claim 3, wherein each of said coil springs has a generally frustoconical configuration, those ends of said springs of larger diameter being adjacent said driven clutch members, respectively, the final coil at the end of smaller diameter of each spring being radially overlapped relative to the next active coil.

5. In a differential mechanism including a pair of colinearly arranged output shafts (12, 14); an annular central driving member (2) arranged in concentrically spaced relation about the adjacent ends of said output shafts; clutch means normally effecting a driving connection between said driving member and said output shafts, respectively, said clutch means including a pair of annular side gears (8, 10) non-rotatably mounted on the adjacent ends of said output shafts, respectively, a pair of driven clutch members (4, 6) mounted on said side gears for axial displacement on opposite sides of said driving member, respectively, and spring means (16, 18) biasing said driven clutch members inwardly in the clutch-engaging direction toward said driving member; means including an annular control cam member (20) operable when one of said output shafts overruns the other for disengaging from said driving member the driven clutch member associated with said overrunning shaft; and holdout ring means (30, 32) for maintaining said associated driven clutch member in the disengaged condition as long as said one output shaft overruns the other shaft, said holdout ring means including a pair of generally annular axially split resilient holdout rings arranged colinearly between said central cam member and said driven clutch members, respectively, the remote ends of said holdout rings being rotatably connected with and extending within annular recesses (4c, 6c) contained in the adjacent faces of said driven clutch members, respectively, the adjacent ends of said holdout rings having axially extending holdout teeth adjacent said central cam member, respectively; the improvement a. wherein each of said holdout rings is resiliently biased radially outwardly into continuous frictional engagement with the outermost side wall of the annular recess contained in the corresponding driven clutch member, respectively, each of said holdout rings including on its outer periphery a circumferential external flange (30a, 32a) that extends within a corresponding annular groove contained in the corresponding outer recess wall, thereby preventing axial movement of said holdout rings relative to said driven clutch members, respectively, each of said holdout rings being angularly adjustable, when the corresponding driven clutch member is in a disengaged condition, from an inoperative first position relative to said central cam member toward an operative second position in which the holdout ring teeth cooperate with said central cam member to maintain the driven clutch member in the disengaged condition, whereby as the rotational speed of the differential mechanism increases, the holdout ring is retained against radial expansion by the outermost recess wall, thereby increasing the frictional engagement between said holdout rings and said driven clutch members, respectively, each of said holdout rings being angularly adjustable, when the corresponding driven clutch member is in a disengaged condition from an inoperative first position relative to said central cam member toward an operative second position in which the holdout ring teeth cooperate with said central cam member to maintain the driven clutch member in the disengaged condition, whereby as the rotational speed of the differential mechanism increases, the holdout ring is retained against radial expansion by the outermost recess wall, thereby increasing the frictional engagement between said holdout rings and said driven clutch members, respectively, said central cam member including on its outer periphery an external central flange (20d); said central cam member being positioned coaxially within said central drive member and said holdout rings being positioned in axially spaced relation on opposite sides of said central flange in the annular spaces between the remote ends of said central cam and central driving members, respectively;

b. and further including pilot means contained solely within said central driving member for journalling the adjacent ends of said side gears within said central cam member;

c. said spring means comprising a pair of coil springs (116, 118) at least partially positioned concentrically within said driven clutch members, respectively, the remote ends of said coil springs being contained within corresponding annular recesses (108d, 110d) contained in the adjacent faces of said side gears, respectively, the opposite ends of said central cam member containing counterbore grooves (120a, 120b) opposite said annular recesses, respectively, said driven clutch members including radially inwardly directed spring retainer means (140, 142) that extend within said counterbore recesses for engagement with the other ends of said coil springs, respectively.

6. In a differential mechanism including a pair of colinearly arranged output shafts (12, 14); an annular central driving member (2) arranged in concentrically spaced relation about the adjacent ends of said output shafts; clutch means normally effecting a driving connection between said driving member and said output shafts, respectively, said clutch means including a pair of annular side gears (8, 10) non-rotatably mounted on the adjacent ends of said output shafts, respectively, a pair of driven clutch members (4, 6) mounted on said side gears for axial displacement on opposite sides of said driving member, respectively, and spring means (16, 18) biasing said driven clutch members inwardly in the clutch-engaging direction toward said driving member; means including an annular central cam member (20) operable when one of said output shafts overruns the other for disengaging from said driving member the driven clutch member associated with said overrunning shaft; and holdout ring means (30, 32) for maintaining said associated driven clutch member in the disengaged condition as long as said one output shaft overruns the other shaft, said holdout ring means including a pair of generally annular axially split resilient holdout rings arranged colinearly between said central cam member and said driven clutch members, respectively, the remote ends of said holdout rings being rotatably connected with and extending within annular recesses (4c, 6c) contained in the adjacent faces of said driven clutch members, respectively, the adjacent ends of said holdout rings having axially extending holdout teeth adjacent said central cam member, respectively; the improvement a. wherein each of said holdout rings is resiliently biased radially outwardly into continuous frictional engagement with the outermost side wall of the annular recess contained in the corresponding driven clutch member, respectively, each of said holdout rings including on its outer periphery a circumferential external flange (30a, 32a) that extends within a corresponding annular groove contained in the corresponding outer recess wall, thereby preventing axial movement of said holdout rings relative to said driven clutch members, respectively, each of said holdout rings being angularly adjustable, when the corresponding driven clutch member is in a disengaged condition, from an inoperative first position relative to said central cam member toward an operative second position in which the holdout ring teeth cooperate with said central cam member to maintain the driven clutch member in the disengaged condition, whereby as the rotational speed of the differential mechanism increases, the holdout ring is retained against radial expansion by the outermost recess wall, thereby increasing the frictional engagement between said holdout rings and said driven clutch members, respectively, said central cam member including on its outer periphery an external central flange (20d); said central cam member being positioned coaxially within said central drive member and said holdout rings being positioned in axially spaced relation on opposite sides of said central flange in the annular spaces between the remote ends of said central cam and central driving members, respectively;

b. and further including pilot means contained solely within said central driving member for piloting the adjacent ends of said side gears, said pilot means comprising means telescopically journalling within an internal bore (208g) contained in one end of one of said side gears an end portion (210e) of the other side gear.

* * * * *

UNITED STATES PATENT OFFICE
CERTIFICATE OF CORRECTION

PATENT NO. : 3,791,238
DATED : February 12, 1974
INVENTOR(S) : Ronald D. Bokovoy It is certified that error appears in the above-identified patent and that said Letters Patent are hereby corrected as shown below:

Column 9, line 32, delete "whereby as";

delete lines 33-37;

line 38, delete "spectively".

Signed and Sealed this

Twenty-fourth Day of October 1978

[SEAL]

Attest:

RUTH C. MASON
Attesting Officer

DONALD W. BANNER
Commissioner of Patents and Trademarks